US010819771B2

(12) United States Patent
Preissl et al.

(10) Patent No.: US 10,819,771 B2
(45) Date of Patent: *Oct. 27, 2020

(54) METHOD FOR VEHICLE DATA COLLECTION

(71) Applicant: Kitty Hawk Corporation, Mountain View, CA (US)

(72) Inventors: Robert Preissl, San Francisco, CA (US); Kosuke Hata, San Francisco, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/446,163

(22) Filed: Jun. 19, 2019

(65) Prior Publication Data

US 2019/0306226 A1 Oct. 3, 2019

Related U.S. Application Data

(63) Continuation of application No. 16/115,429, filed on Aug. 28, 2018, now Pat. No. 10,375,147, which is a continuation of application No. 15/621,826, filed on Jun. 13, 2017, now Pat. No. 10,097,615.

(51) Int. Cl.
| | |
|---|---|
| *H04L 29/08* | (2006.01) |
| *G08G 5/00* | (2006.01) |
| *H04L 29/06* | (2006.01) |
| *B64F 5/60* | (2017.01) |
| *B64C 27/20* | (2006.01) |
| *H04W 88/02* | (2009.01) |
| *H04W 4/80* | (2018.01) |
| *B64D 45/00* | (2006.01) |

(52) U.S. Cl.
CPC .............. *H04L 67/06* (2013.01); *B64C 27/20* (2013.01); *B64F 5/60* (2017.01); *G08G 5/003* (2013.01); *G08G 5/0013* (2013.01); *H04L 65/40* (2013.01); *H04L 67/12* (2013.01); *H04L 67/2857* (2013.01); *B64D 2045/0085* (2013.01); *H04W 4/80* (2018.02); *H04W 88/02* (2013.01)

(58) Field of Classification Search
CPC . H04L 65/40; B64D 2045/0085; G08G 5/003
See application file for complete search history.

(56) References Cited

U.S. PATENT DOCUMENTS

| | | | |
|---|---|---|---|
| 6,181,990 B1 | 1/2001 | Grabowsky et al. | |
| 7,328,011 B2 | 2/2008 | Fagan | |
| 7,596,435 B1 * | 9/2009 | Tripathi | G07C 5/008 701/29.3 |
| 8,140,358 B1 * | 3/2012 | Ling | G07C 5/008 705/4 |
| 8,509,963 B1 * | 8/2013 | Barnes | G06F 11/0775 701/2 |
| 8,682,509 B2 | 3/2014 | Goodrich | |

(Continued)

*Primary Examiner* — Lashonda T Jacobs
(74) *Attorney, Agent, or Firm* — Van Pelt, Yi & James LLP

(57) ABSTRACT

A vehicle data collection method is disclosed. The method comprises receiving vehicle data, determining that an internet connection is not available, storing the vehicle data, determining that an internet connection has become available, and transmitting the vehicle data based at least in part on the determination that an internet connection has become available.

22 Claims, 12 Drawing Sheets

(56) References Cited

U.S. PATENT DOCUMENTS

| | | | |
|---|---|---|---|
| 8,700,236 B1 | 4/2014 | Berman | |
| 8,881,294 B2* | 11/2014 | Johnson | H04L 63/123 |
| | | | 726/26 |
| 9,682,785 B2 | 6/2017 | Pescod | |
| 10,075,228 B2* | 9/2018 | Klippert | B64F 5/60 |
| 10,304,264 B2* | 5/2019 | Camisa | G07C 5/085 |
| 10,332,324 B2* | 6/2019 | Jover | G07C 5/006 |
| 2003/0003872 A1* | 1/2003 | Brinkley | H04L 67/04 |
| | | | 455/66.1 |
| 2003/0109973 A1* | 6/2003 | Hensey | H04W 12/08 |
| | | | 701/32.6 |
| 2004/0008253 A1 | 1/2004 | Monroe | |
| 2004/0027255 A1 | 2/2004 | Greenbaum | |
| 2004/0260777 A1 | 12/2004 | Kolb | |
| 2007/0027589 A1* | 2/2007 | Brinkley | G08G 5/0013 |
| | | | 701/3 |
| 2007/0072639 A1 | 3/2007 | Frost | |
| 2007/0111725 A1* | 5/2007 | Kauffman | H04B 7/18506 |
| | | | 455/431 |
| 2007/0115938 A1* | 5/2007 | Conzachi | B64F 5/60 |
| | | | 370/352 |
| 2010/0033308 A1* | 2/2010 | Muirhead | G07C 5/008 |
| | | | 340/10.1 |
| 2010/0267375 A1 | 10/2010 | Lemmon | |
| 2011/0012720 A1* | 1/2011 | Hirschfeld | B60W 40/09 |
| | | | 340/439 |
| 2011/0246002 A1 | 10/2011 | Shavit | |
| 2012/0191273 A1 | 7/2012 | Jacobs | |
| 2012/0265372 A1 | 10/2012 | Hedrick | |
| 2014/0002651 A1* | 1/2014 | Plante | G08G 1/20 |
| | | | 348/148 |
| 2014/0081483 A1 | 3/2014 | Weinmann | |
| 2014/0136658 A1* | 5/2014 | Wahler | H04B 7/18506 |
| | | | 709/218 |
| 2015/0032296 A1 | 1/2015 | Girard | |
| 2015/0120132 A1* | 4/2015 | Kramer | G07C 5/008 |
| | | | 701/31.4 |
| 2015/0339241 A1 | 11/2015 | Warner | |
| 2016/0019793 A1* | 1/2016 | Fournier | G08G 5/0034 |
| | | | 701/400 |
| 2016/0036513 A1 | 2/2016 | Klippert | |
| 2016/0049019 A1 | 2/2016 | Mahalingaiah | |
| 2016/0093222 A1 | 3/2016 | Hale | |
| 2016/0260264 A1 | 9/2016 | Shih | |
| 2017/0142187 A1* | 5/2017 | Pimentel | H04L 67/14 |
| 2017/0228945 A1 | 8/2017 | Lee | B60R 25/2018 |
| 2017/0293809 A1* | 10/2017 | Thompson | H04N 7/183 |
| 2017/0368992 A1* | 12/2017 | Briggs | B60W 40/09 |
| 2018/0146505 A1* | 5/2018 | Lauer | H04W 84/005 |
| 2019/0340933 A1* | 11/2019 | Villa | G01C 23/00 |

* cited by examiner

METHOD FOR VEHICLE DATA COLLECTION

CROSS REFERENCE TO OTHER APPLICATIONS

This application is a continuation of U.S. patent application Ser. No. 16/115,429, now U.S. Pat. No. 10,375,147, entitled METHOD FOR VEHICLE DATA COLLECTION filed Aug. 28, 2018, which is a continuation of U.S. patent application Ser. No. 15/621,826, now U.S. Pat. No. 10,097,615, entitled METHOD FOR VEHICLE DATA COLLECTION filed Jun. 13, 2017, both of which are incorporated herein by reference for all purposes.

BACKGROUND OF THE INVENTION

Vehicle data may be used to analyze usage patterns, determine efficient trajectories, or determine other relevant metrics. Analysis may require a large amount of computing power and in some cases is based on vehicle data from multiple vehicles. In some instances, weight or connectivity limitations prevent the analysis from occurring onboard the vehicle.

BRIEF DESCRIPTION OF THE DRAWINGS

Various embodiments of the invention are disclosed in the following detailed description and the accompanying drawings.

DETAILED DESCRIPTION

Figure 1A:
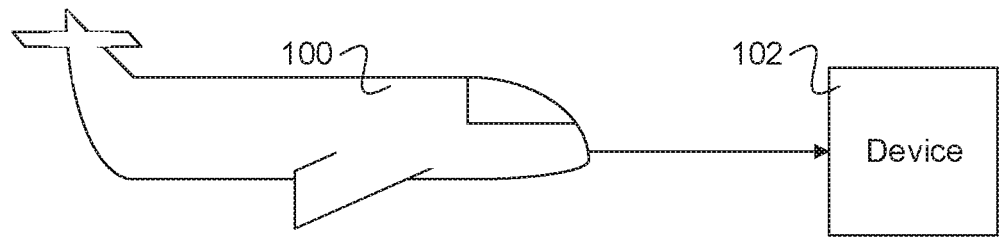
FIG. 1A is a diagram illustrating an embodiment of data transfer from an aircraft to a device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A vehicle data collection method is disclosed. The method comprises receiving vehicle data, determining that an internet connection is not available, storing the vehicle data, determining that an internet connection has become available, and transmitting the vehicle data based at least in part on the determination that an internet connection has become available. Various actions may be executed based on the determination of whether an internet connection is available, such as intermittent connectivity checks, prompting, or locking the vehicle.

Vehicle data may be utilized by pilots/drivers or a vehicle company to survey usage patterns, determine ways to improve trips, or perform other analysis. In some instances, vehicle data analysis cannot be performed onboard a vehicle due to computing requirements or weight constraints. Vehicle data from multiple vehicles may be desired, requiring a means of data congregation. However, vehicles traveling in remote areas without a WiFi or cellular connection may experience difficulties in communicating vehicle data to another vehicle or to a shared network. In the disclosed method, a check is performed to determine whether an internet connection is available, and data management is based upon the determination. For example, vehicle data may be relayed in real-time in the event an internet connection is available during a trip. In the event an internet connection is not available during the trip, vehicle data is maintained until a connection is available. Data for multiple vehicles may be sent to a shared network and analyzed, with the resulting analysis provided to relevant parties.

The disclosed method may be executed by a vehicle data recording device of the vehicle. In some embodiments, a lower resolution data or subset of data recorded by the recording device is desired for analysis. The disclosed method may be executed on a second device either installed on the vehicle or independent of the vehicle, wherein a subset of vehicle data recording device data is transferred and stored on the second device. For example, a portable device capable of being transported independently of the vehicle such as a smart phone, tablet, smart watch, or other internet of things (IoT) device may be used. A portable device may be ideal in the event the vehicle is not easily transported to a location with an internet connection (e.g. the vehicle is an aircraft that typically lands on water or a large truck designed for specific terrain). The disclosed method may be executed by an application capable of running on multiple platforms.

FIG. 1A is a diagram illustrating an embodiment of data transfer from an aircraft to a device. In various embodiments, the method may be used in an electric car, electric aircraft, or any appropriate vehicle. In an electric car application, the vehicle data comprises electric car data. In an aircraft application, the vehicle data comprises flight data.

In the example shown, flight data is transferred from aircraft 100 to device 102. The data transfer may occur following landing. In some embodiments, the data transfer occurs each time a flight is completed on aircraft 100. Flight data may be collected during flight and stored on aircraft 100 using an electronic recording device. A subset of the detailed flight data may be transferred to device 102 in the event the electronic recording device collects more detailed flight data than is desired for analysis. In some embodiments, time series data and log files are stored onboard the aircraft. Time series data may be transferred to the device whereas the log files are not. Camera footage or audio data (e.g. from inside the fuselage) may be recorded and transferred.

A dependable internet or cellular connection may not be available during flight or at landing. In some embodiments, data transfer between a computer memory (e.g. of an electronic recording device) onboard the aircraft and device 102 occurs over a wireless connection that does not require internet. For example, a Bluetooth connection is used or a local area network (LAN) is generated on the aircraft. In the event a local area network is used, device 102 receives data from a vehicle data recording or storage device on the local area network by specifying a corresponding hard-coded internet protocol (IP) address. A wireless connection may be used to decrease steps a pilot or user must take. For example, a portable device is not required to be plugged in anywhere on the aircraft. In some embodiments, a wired connection such as a universal serial bus (USB) connection is used. In the example shown, device 102 is not installed in the aircraft. Device 102 may comprise a smart phone, tablet, smart watch, or other IoT device. The device may comprise an application designed to facilitate the data transfer and store the collected data.

In some embodiments, device 102 is installed within the aircraft and the entire aircraft is transported to a location with a network connection. In some embodiments, flight recording device data is not transmitted to a separate device. The flight recording device comprises software that performs the internet check and facilitates data transfer.

Figure 1B:
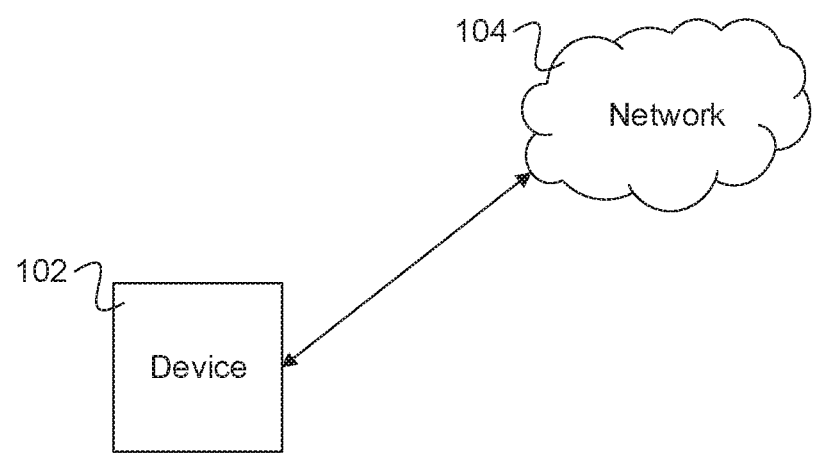
FIG. 1B is a diagram illustrating an embodiment of data transfer from a device to a network.

FIG. 1B is a diagram illustrating an embodiment of data transfer from a device to a network. In the example shown, flight data is uploaded from device 102 to network 104. Device 102 may be transported to a location with an internet connection after it receives flight data from an aircraft. For example, the device is a personal device of the aircraft pilot. When the pilot returns to home, work, or a location with an internet connection, the flight data is uploaded to an online network. In some embodiments, an application installed on the device enables the flight data to be synced to the network automatically.

Syncing to an online network may allow the flight data to be processed by a powerful processor or be analyzed together with data from other aircraft. In some embodiments, the flight data is uploaded to an online network where it is downloaded by a separate processor. In some embodiments, the flight data is analyzed on the online network, for example by using online tools. In some embodiments, the flight data is uploaded via an internet connection to a processor that congregates and processes flight data for multiple aircraft. An aircraft company may have access to the online network or congregational processor. The aircraft company may make decisions for future designs of the aircraft or provide advice to pilots based on the flight data.

Figure 2A:
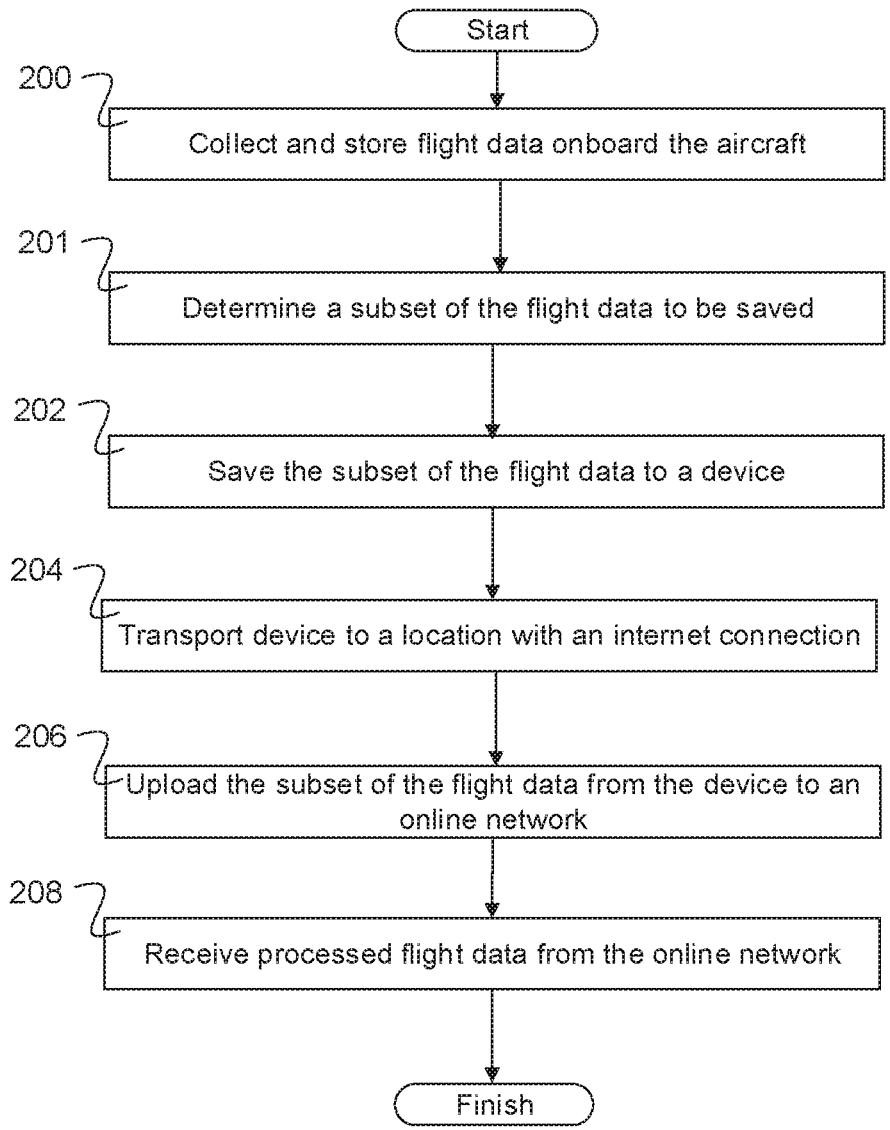
FIG. 2A is a flow diagram illustrating an embodiment of a flight data collection process.

FIG. 2A is a flow diagram illustrating an embodiment of a flight data collection process. At 200, flight data is collected and stored onboard the aircraft. Flight data is collected and stored on a "black box" or flight data recording device. The flight data recording device may store high resolution data. The flight data is stored on a computer memory. At 201, a subset of the flight data to be saved is determined. A subset of the flight data recording device data is saved to a separate device either installed in the aircraft or a portable device. In the event a separate device is not used, a subset of flight data determined not to be saved is deleted from the flight data recording device. At 202, a subset of the flight data is saved to a device (e.g. the separate device or the flight data recording device). The subset of the flight data may comprise data that is of interest to a pilot or aircraft company. At 204, the device is transported to a location with an internet connection. At 206, the subset of the flight data is uploaded from the device to an online network. The flight data may be downloaded from the online network and processed, with processed flight data uploaded back to the online network. In some embodiments, the flight data is processed on the network. At 208, processed flight data from the online network is received. The device may display processed flight data via an application installed on the device.

Figure 2B:
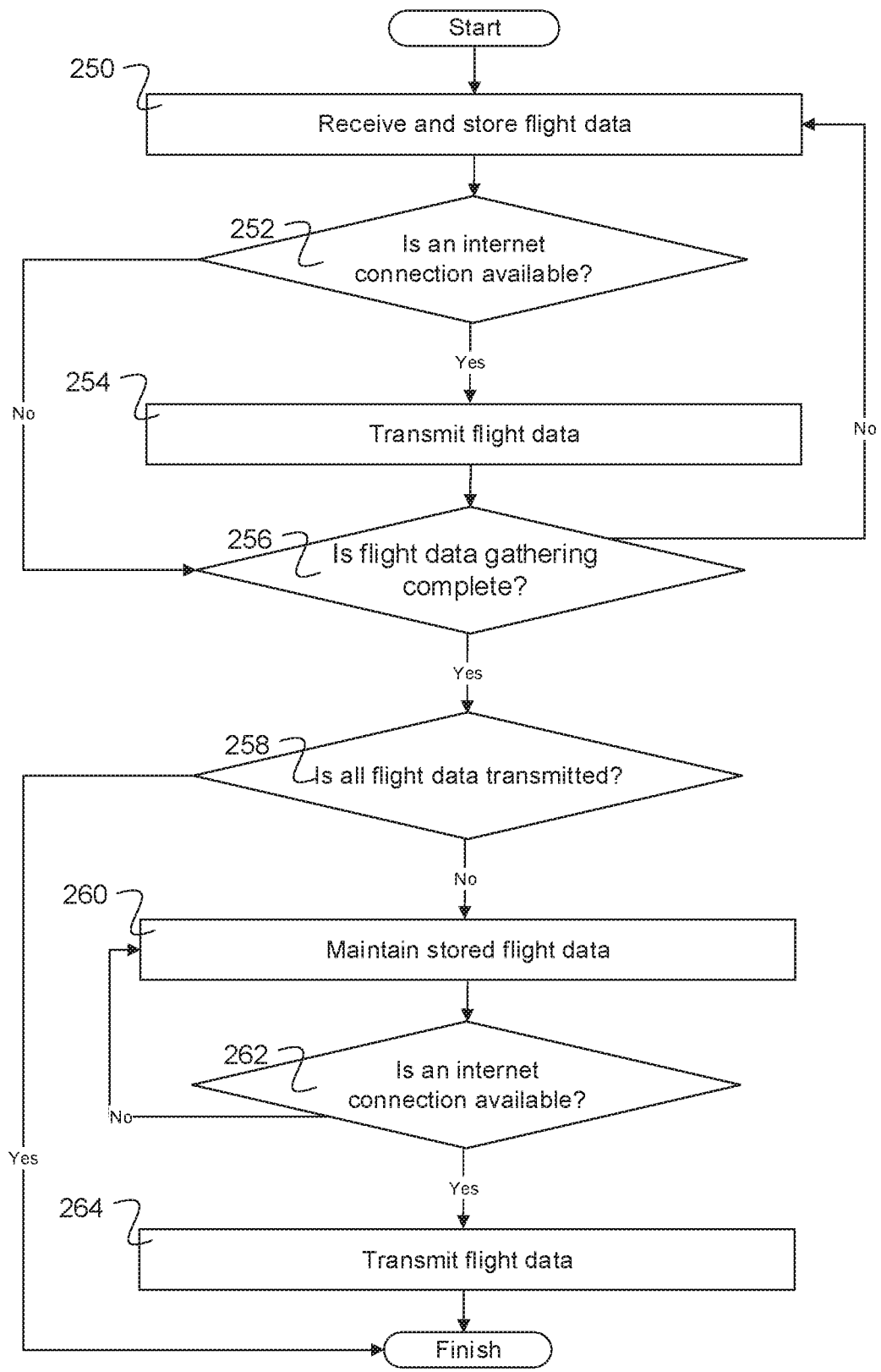
FIG. 2B is a flow diagram illustrating an embodiment of a flight data collection process.

FIG. 2B is a flow diagram illustrating an embodiment of a flight data collection process. At 250, flight data is received and stored. At 252, it is determined whether an internet connection is available. In the event an internet connection is available, at 254 flight data is transmitted. The flight data may be packaged and sent, wherein packaging comprises formatting or editing the data. The data may be sent to an online network. After sending the flight data or in the event an internet connection is not available, at 256 it is determined whether flight data gathering is complete. For example, flight data is transmitted while the aircraft is mid-flight. Gathering is complete when the aircraft has completed flight. In the event flight data gathering is not complete, the process returns to 250. In the event flight data gathering is complete, at 258 it is determined whether all flight data has been transmitted. In the event an internet connection was not available during flight, the flight data may not have been sent at all or in entirety. In the event all flight data is sent, the process is finished. In the event not all flight data is sent, the stored flight data is maintained at 260. Maintaining the stored data may comprise refreshing the data or ensuring the data is not overwritten. At 262 it is determined whether an internet connection is available. In the event an internet connection is not available, the stored flight data is maintained until an internet connection is available. Intermittent internet checks may be performed. In the event the internet connection is available, at 264 flight data is packaged and sent and the process is finished.

Figure 2C:
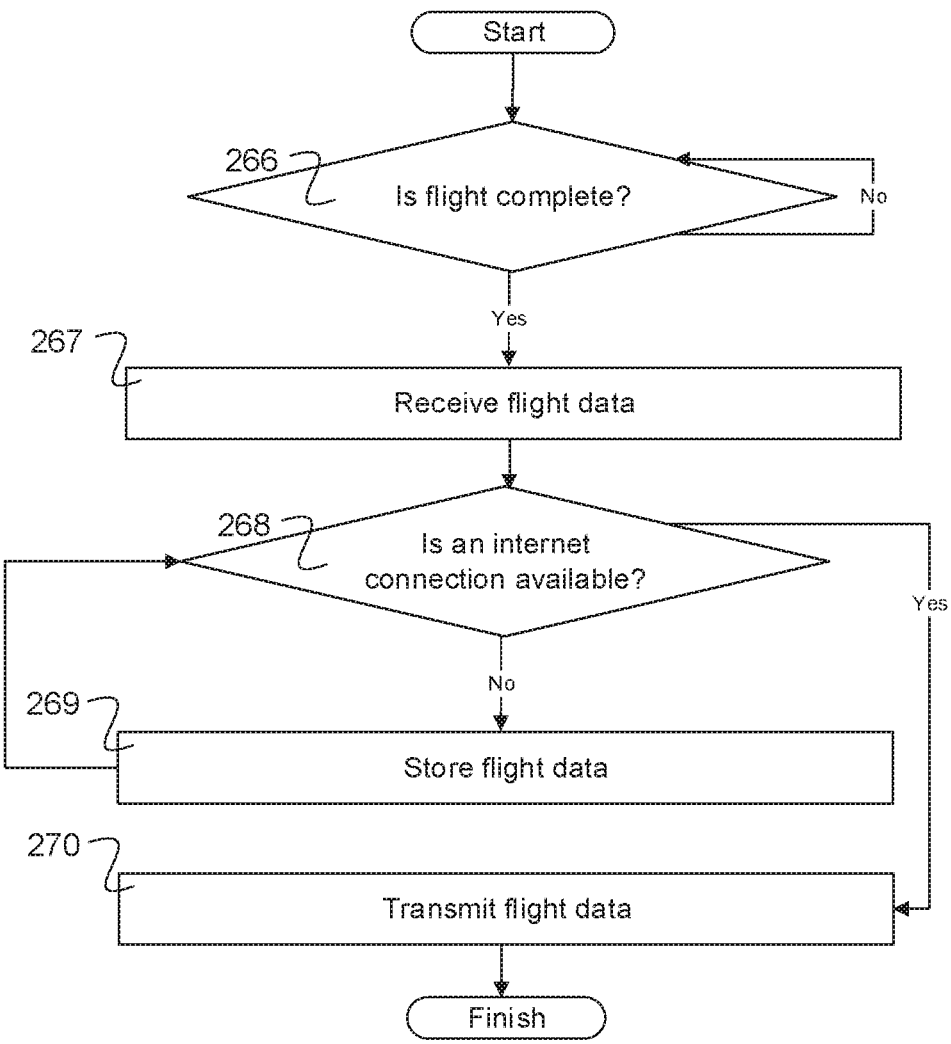
FIG. 2C is a flow diagram illustrating an embodiment of a flight data collection process.

FIG. 2C is a flow diagram illustrating an embodiment of a flight data collection process. In some embodiments, data transmission from the aircraft to an online network occurs solely after flight is complete. Flight data recorder activity is limited to data collection during the time of flight. At 266, it is determined whether flight is complete. In the event flight is complete (e.g. the aircraft has landed), at 267 flight data is received. Flight data is received in the event the flight data recorder is not the uploading device. For example, a portable device or uploading device installed on the aircraft receives flight data from a flight data recorder onboard the aircraft. At 268, it is determined whether an internet connection is available. In the event an internet connection is available, at 270 flight data is transmitted and the process is finished. The flight data is transmitted to an online network. In the event an internet connection is not available, at 269 the flight data is stored until it is determined that an internet connection is available.

In various embodiments, the processes and connections described above as pertaining to aircraft pertain to other types of vehicles analogously. For example, vehicle data is considered rather than specifically flight data. A vehicle data recorder is used rather than a flight data recorder. Rather than determining whether a flight is complete, it is determined whether a vehicle trip is complete. In some embodiments, completion of a trip or flight is determined based on when a vehicle is turned on or off.

Figure 2D:
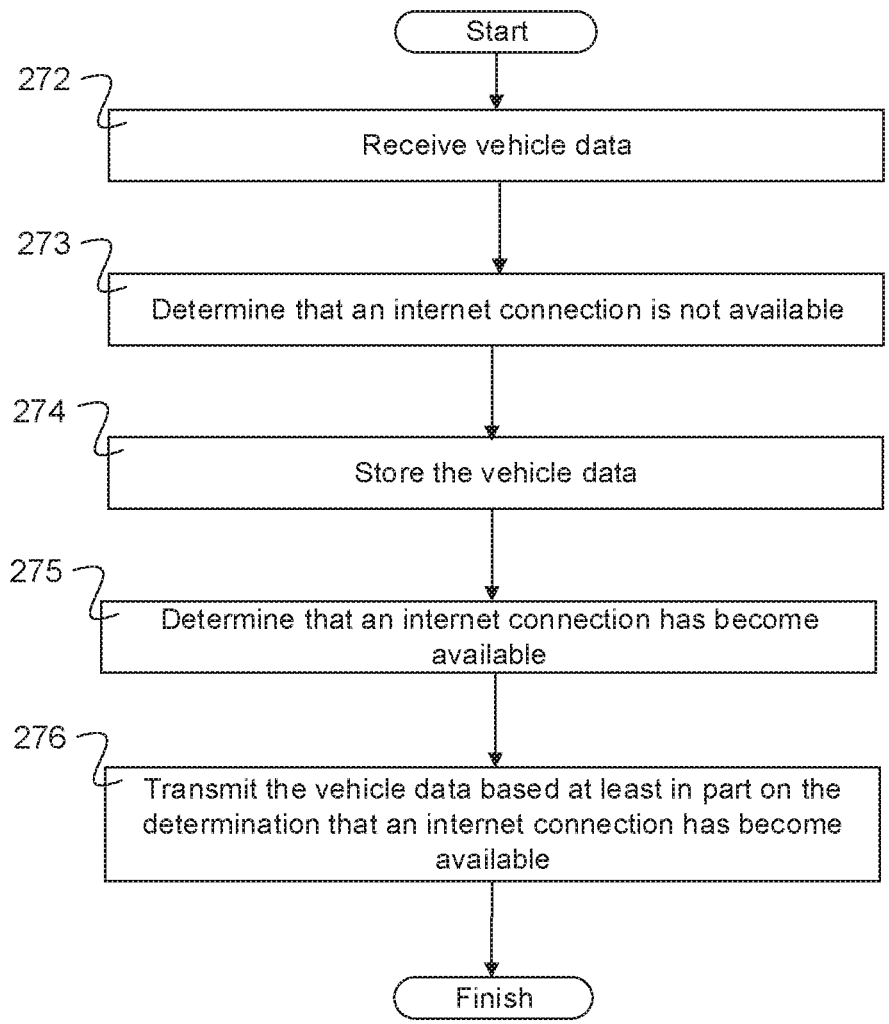
FIG. 2D is a flow diagram illustrating an embodiment of a vehicle data collection process.

FIG. 2D is a flow diagram illustrating an embodiment of a vehicle data collection process. At 272, vehicle data is received. The vehicle data may be received from a vehicle data recorder in the event a second device is used for uploading the vehicle data to an online network. The vehicle data may be received from sensors and actuators in the event the vehicle data recorder is used to directly upload vehicle data. At 273, it is determined that an internet connection is not available. The vehicle may travel through remote locations without connectivity. At 274, the vehicle data is stored. For example, the vehicle data is stored on the vehicle data recorder or the second device. At 275, it is determined that an internet connection has become available. At 276, the vehicle data is transmitted based at least in part on the determination that an internet connection has become available.

Figure 3:
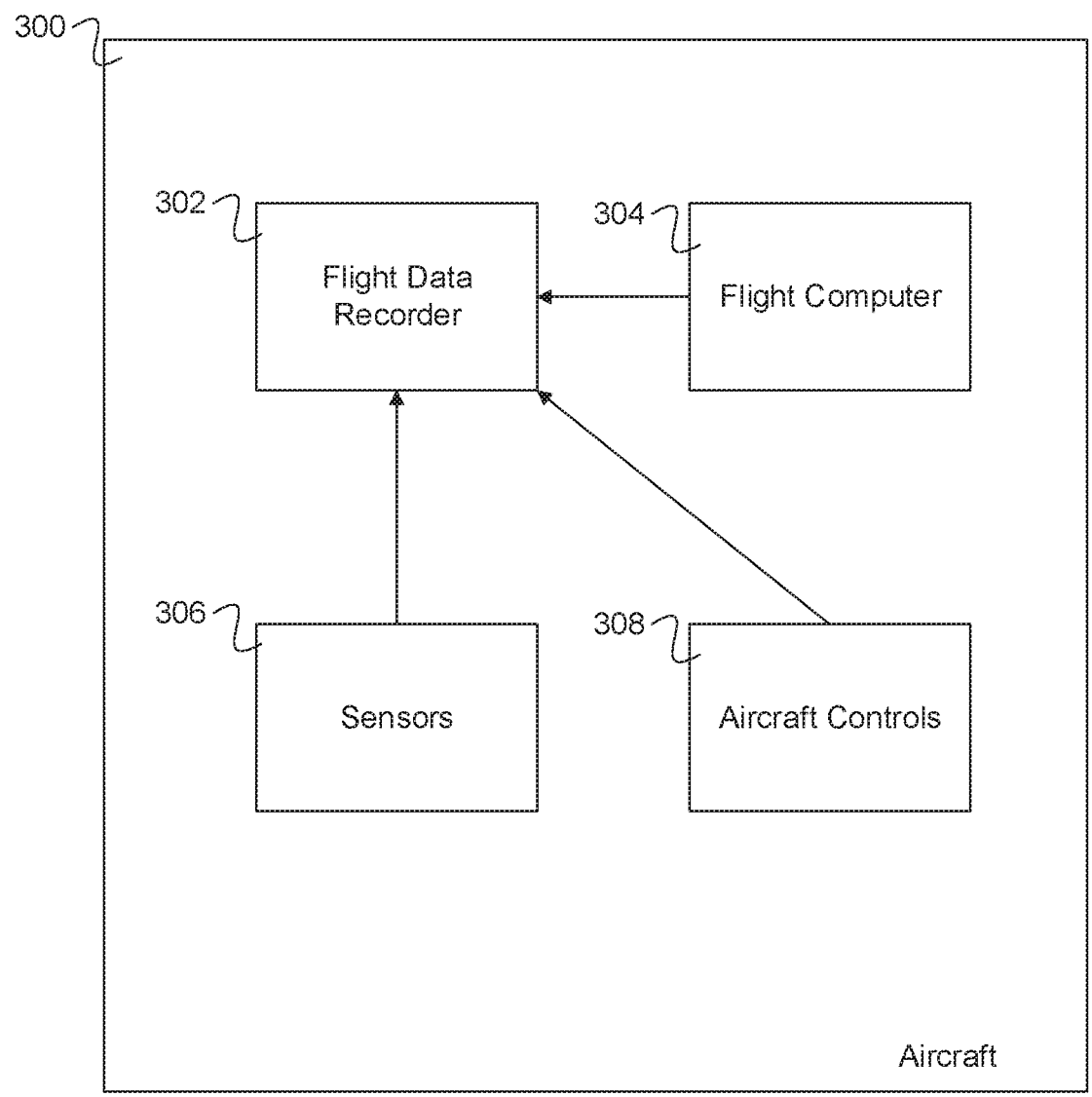
FIG. 3 is a diagram illustrating an embodiment of onboard flight data collection elements.

FIG. 3 is a diagram illustrating an embodiment of onboard flight data collection elements. In the example shown, aircraft 300 comprises flight data recorder 302, flight computer 304, sensors 306, and aircraft controls 308. Flight data recorder 302 may record flight data at regular intervals (e.g. every half second) throughout flight. In some embodiments, the flight data recorder records data in faster intervals in the event an abnormal change is detected. For example, if an extreme change in yaw is recorded, the flight data recorder may increase in frequency of recordings. The flight recorder may record actuator positions, pilot instructions, flight computer instructions, sensor data, engine information, time and date, or any other appropriate data. In the example shown, flight data recorder 302 receives inputs from flight computer 304, sensors 306, and aircraft controls 308.

Figure 4:
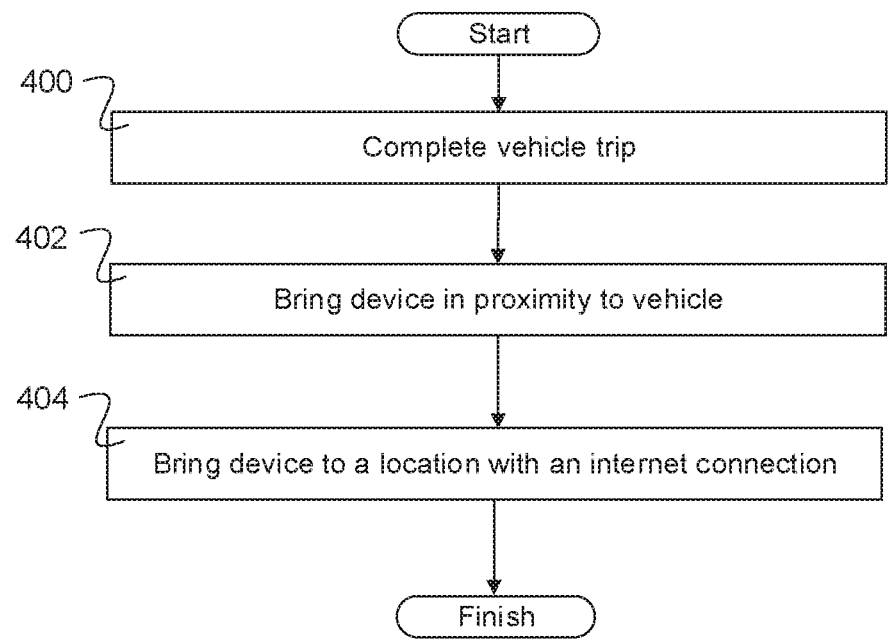
FIG. 4 is a flow diagram illustrating an embodiment of user actions throughout a vehicle data collection process.

FIG. 4 is a flow diagram illustrating an embodiment of user actions throughout a vehicle data collection process. At 400, a vehicle trip is completed. At 402, a device is brought in proximity to the vehicle. In some embodiments, the device comprises an application that sets up data to sync from a device onboard the vehicle to the device when the device is brought within a set distance from the vehicle and the vehicle is detected to have completed a trip. The application determines whether the device onboard the vehicle has stored data that has not yet been uploaded. In some embodiments, each trip is tracked with a unique trip number that is used to determine whether data has already been uploaded. For example, the trip number is incremented each time the vehicle is turned on. At 404, the device is brought to a location with an internet connection. In some embodiments, the device comprises an application that automatically uploads vehicle data from the device to specified online network when the device is brought into a location with an internet connection.

In some embodiments, a separate portable device is not used. The uploading device may be installed in the vehicle. User (e.g. pilot or driver) actions would comprise ending the trip in a location with an internet connection or transporting the vehicle to a location with an internet connection following trip completion.

Figure 5:
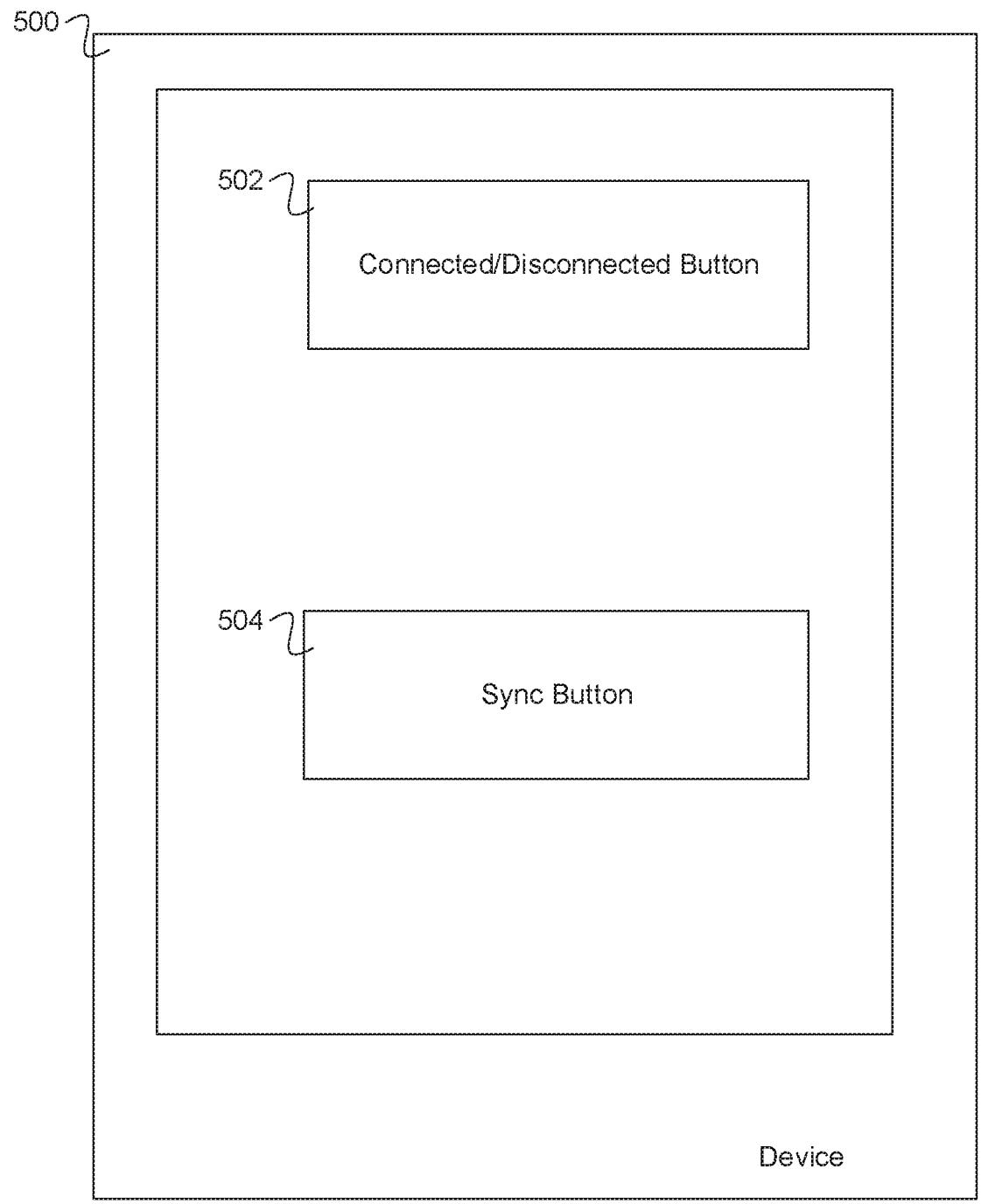
FIG. 5 is a diagram illustrating an embodiment of a vehicle data collection application.

FIG. 5 is a diagram illustrating an embodiment of a vehicle data collection application. A vehicle data collection application may provide a simple interface for a user or passenger of the vehicle to collect data from the vehicle and provide the data to an online network. In the example shown, device 500 comprises a display with connected/disconnected button 502 and sync button 504. The buttons may comprise virtual buttons that appear on the device screen. When using a separate device from the vehicle data recording device, connected/disconnected button 502 may display "connected" when the separate device is connected to a vehicle data recorder or storage device onboard the vehicle. "Connected" may let a pilot or customer know that the device is able to begin the data transfer. Button 502 may display "disconnected" when the connection between the device and the vehicle is broken. For example, a portable device may be brought out of range for WiFi-direct or a cable connecting a separate device and an vehicle data recorder may be unplugged. In some embodiments, a user presses sync button 504 when the device is connected to begin data transfer from the vehicle to the device. In some embodiments, sync button 504 is pressed when the device is brought to a location with an internet connection. Pressing the sync button in that environment may begin data transfer from the device to an online network.

In various embodiments, the interface of the application takes different forms. For example, the application may comprise a "fetch from vehicle" button or "upload to cloud" button.

An electronic recording device onboard the vehicle may comprise a corresponding application program interface (API), which is used in transferring data from the recording device to the upload device. For example, the electronic recording device may comprise a time series database that has a corresponding API which allows a mobile phone or other smart device to access the data. An application on the mobile phone issues requests from the API to retrieve data. A separate database may be used on the portable device, such as a mobile database. Data is transferred from the mobile database to an online database, which also has a corresponding API. In some embodiments, a data visualization tool reads from the online database.

Figure 6:
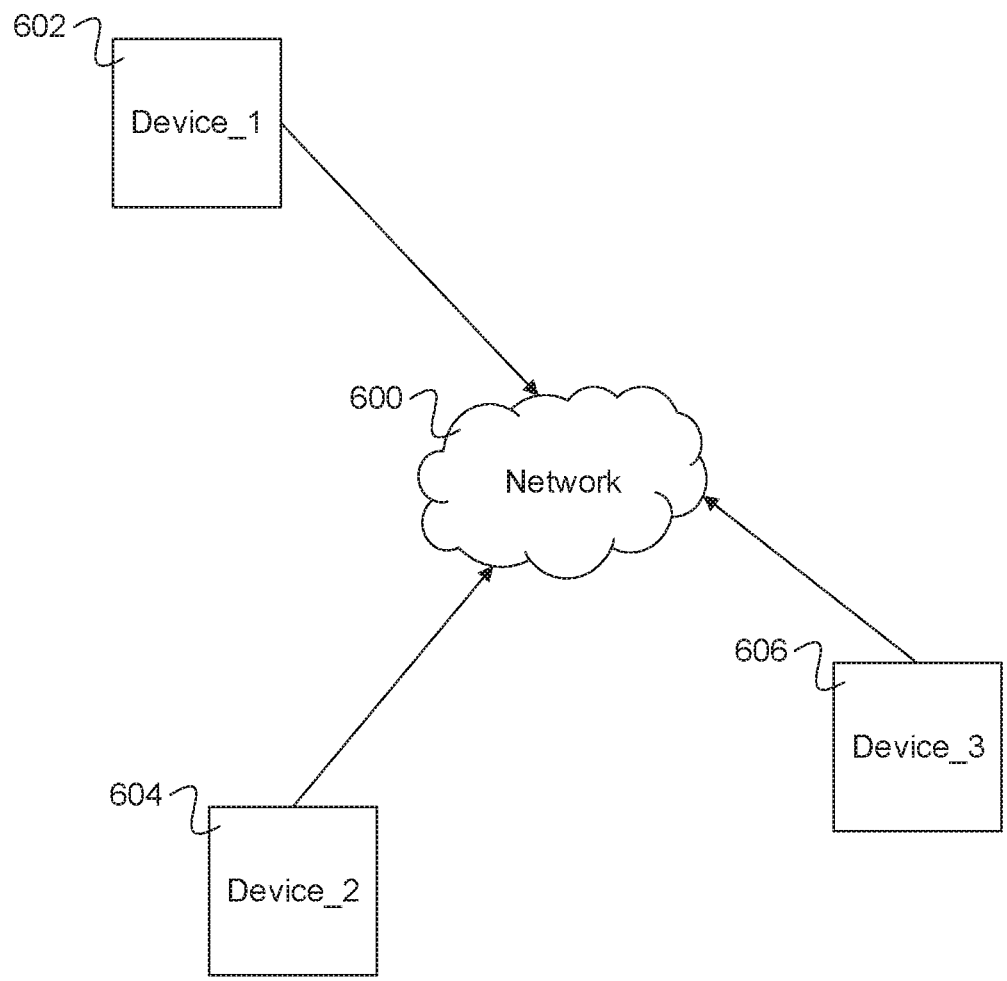
FIG. 6 is a diagram illustrating an embodiment of devices connected to a network.

FIG. 6 is a diagram illustrating an embodiment of devices connected to a network. In the example shown, device_1 602, device_2 604, and device_3 606 are connected to network 600. Multiple devices may upload vehicle data pertaining to multiple vehicles to a shared network. Processing may occur based on aggregated vehicle data. The aggregated vehicle data may be used for the purposes of an vehicle company or provided to customers interested in the vehicles. A vehicle company or other owner of the shared network may determine how to process the data or access to the data.

Figure 7:
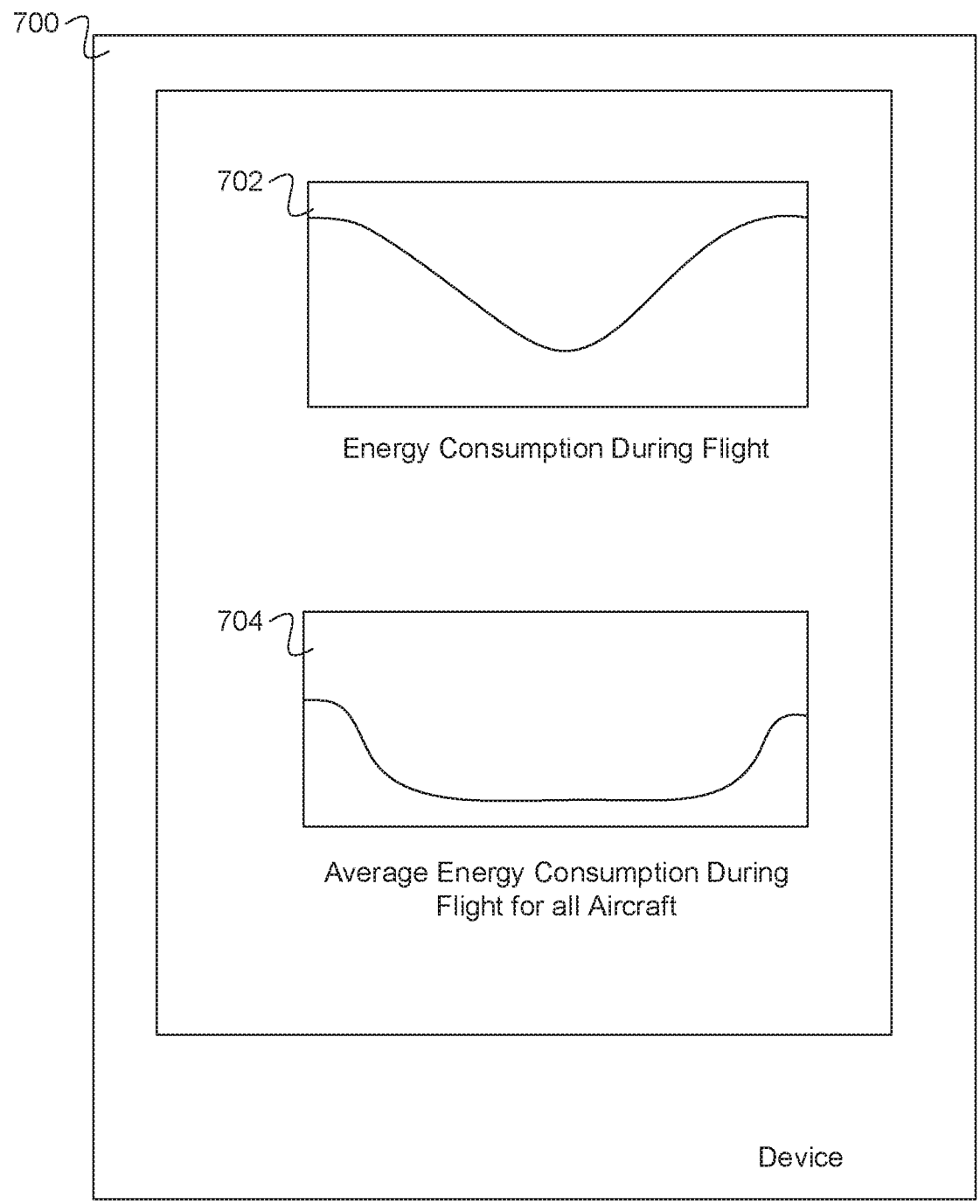
FIG. 7 is a diagram illustrating an embodiment of a vehicle data application displaying processed flight data.

FIG. 7 is a diagram illustrating an embodiment of a vehicle data application displaying processed vehicle data. Processed vehicle data may be provided to a device from the online network and displayed via an application. The application may comprise data collection and data viewing or may be a separate application dedicated to data viewing and analytics. For example, a user selects specific parameters to view in various formats, such as graphs, charts, or tables. In the example shown, table 702 displays energy consumption during flight for an aircraft associated with device 700. Table 704 displays average energy consumption during flight for all aircraft.

In some embodiments, a portable device may be associated with multiple vehicles. A data collection or data viewing application installed on the device may have a method of selecting a specific vehicle within the application. In various applications, various diagnostics are performed and provided based on the vehicle data.

In the event the data uploading device is a portable device not installed in the vehicle, the portable device may be a user's personal device. A data collection and/or data viewing application may be required to be installed on the user's personal portable device. In some embodiments, the application may enable the portable device to act as a key that unlocks the vehicle, ensuring that the pilot has a device with the corresponding application installed when embarking on a trip using the vehicle. The application may comprise features to encourage or ensure a user syncs data to the online network. For example, the application may send reminders to a user or lock a user out of a vehicle if vehicle data has not been uploaded.

Figure 8:
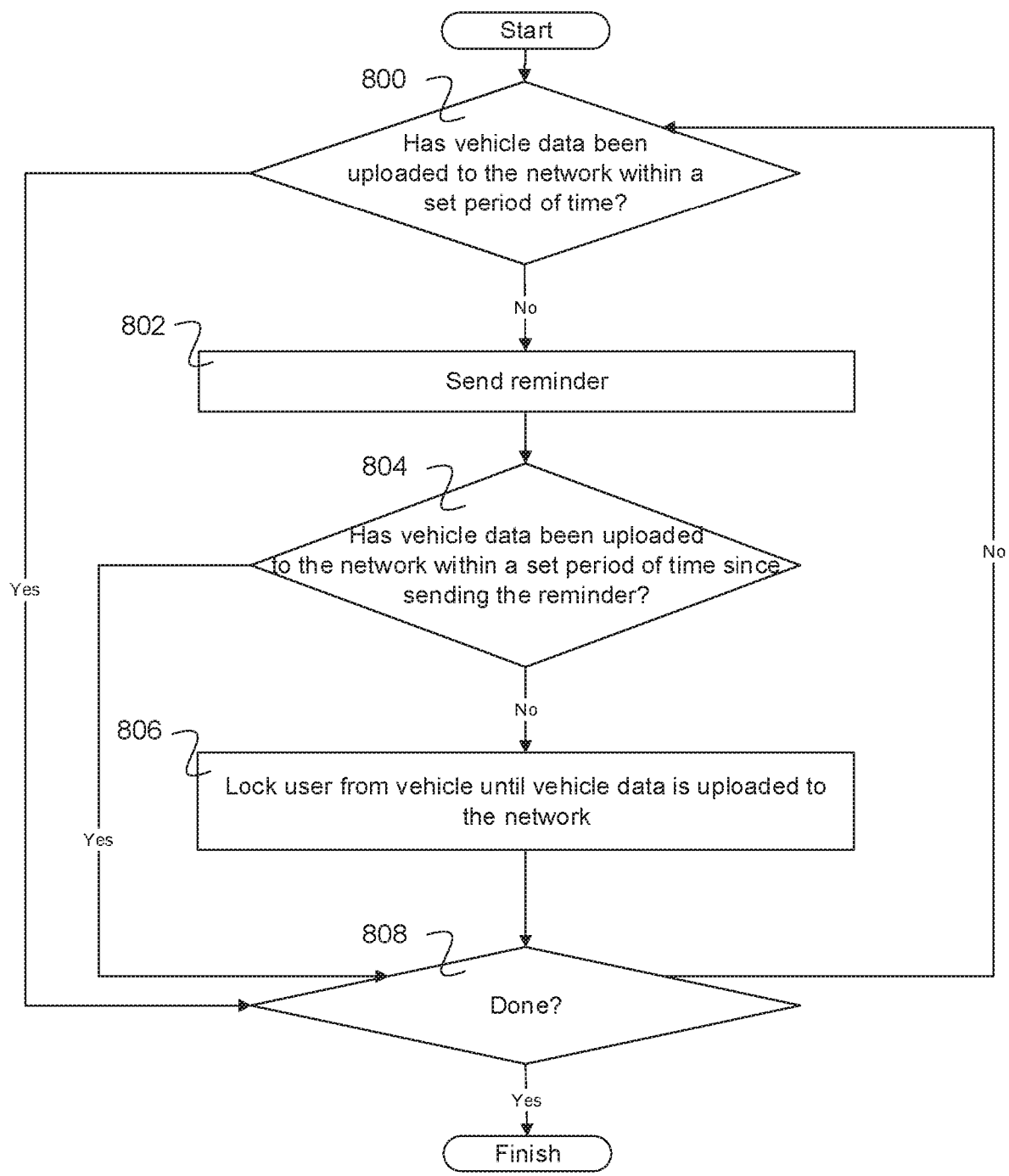
FIG. 8 is a flow diagram illustrating an embodiment of a data upload prompt process.

FIG. 8 is a flow diagram illustrating an embodiment of a data upload prompt process. A first reminder is provided and then in the event the reminder is not followed up on, the vehicle is locked. At 800, it is determined whether vehicle data has been uploaded to the network within a set period of time. For example, the vehicle data may be required to be uploaded within a few days of a trip. In the event vehicle data has not been uploaded to the network within a set period of time, at 802 a reminder is sent to a device. The device may be a portable device, vehicle data recording device, or device installed on the vehicle that is not the vehicle data recording device. A data collection application on the device may provide a reminder notification. At 804, it is determined whether vehicle data has been uploaded to the network within a set period of time since sending the reminder. In the event vehicle data has not been uploaded to the network within a set period of time since sending the reminder, at 806 the user is locked from the vehicle until vehicle data is uploaded to the network. For example, an application on the device may be used as a virtual key. Without uploading the vehicle data, the application may prevent the vehicle from starting. In the event vehicle data has been uploaded (e.g. in the original set period of time, following the reminder, or following lock-out), at 808 it is determined whether the process is done. For example, the process is finished in the event the vehicle has not been taken on more trips or all vehicle data has been uploaded. In the event the process is not done, subsequent iterations are carried out.

Figure 9:
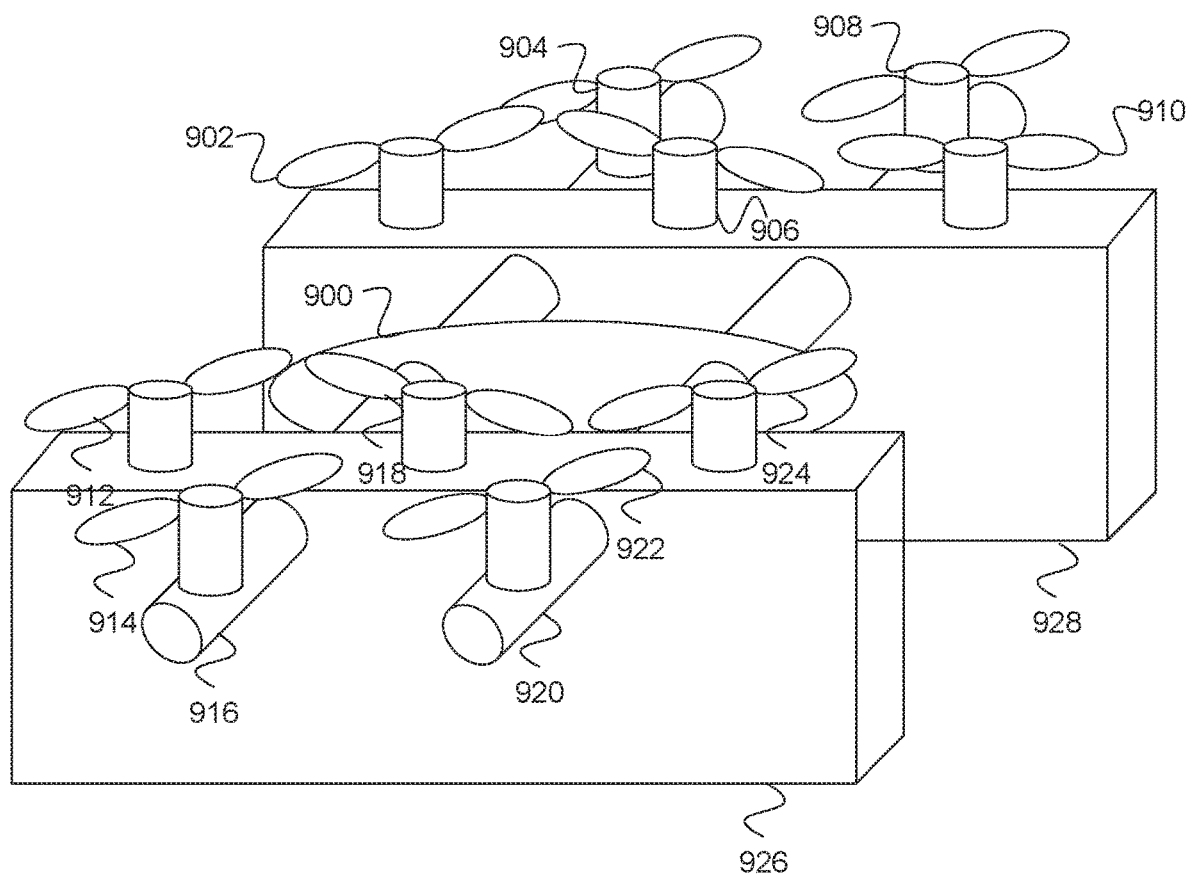
FIG. 9 is a diagram illustrating an embodiment of an aircraft.

FIG. 9 is a diagram illustrating an embodiment of an aircraft. In some embodiments, the method for collecting data is used in a multicopter designed to fly over water. The aircraft may be typically landed on bodies of water, where an online or cellular connection may be less prevalent. In the aircraft shown, fuselage 900 has two booms (916 and 920) which pass through it, perpendicular to the fuselage. The booms also pass through floats 926 and 928, which are located on either side of the fuselage. Rotors 912, 918, and 924 are positioned on float 926 whereas rotors 902, 906, and 910 are positioned on float 928. Rotors 915 and 904 are positioned on boom 916, on either side of the floats. Rotors 908 and 922 are positioned on boom 920, on either side of the floats. The flight data collection method may be used to collect data on thrusts of the rotors, pitch of the aircraft, or any appropriate parameter.

In the event the disclosed method is executed on a portable IoT device, the vehicle may be designed around the device. For example, the vehicle controls may comprise a slot for a tablet or smart phone. Inserting the tablet or smart phone may unlock the vehicle.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vehicle data collection method, comprising:
receiving vehicle data at a first device on a vehicle during vehicle operation;
determining a subset of the vehicle data to be stored while the vehicle is in operation; and
transmitting the subset of the vehicle data to a second device;
wherein the second device is configured to determine that an internet connection to an online network has become available to the second device and to upload the stored vehicle data to the online network accessible by a remote processor based at least in part on the determination that the internet connection has become available.

2. The method of claim 1, wherein the second device comprises a tablet, phone, or other portable connected device.

3. The method of claim 1, wherein the first device is installed on the vehicle.

4. The method of claim 1, wherein the first device comprises a vehicle data recording device installed on the vehicle.

5. The method of claim 1, wherein stored vehicle data comprises time series data.

6. The method of claim 1, wherein stored vehicle data comprises audio data, video data, or actuator parameters.

7. The method of claim 1, wherein the vehicle data is transmitted to the second device over a Bluetooth connection, over a local area network, or in absence of an internet or cellular connection.

8. The method of claim 1, comprising determining whether the internet connection is secured.

9. A vehicle data recording device configured to:
receive vehicle data at a first device on a vehicle during vehicle operation;
determine a subset of the vehicle data to be stored while the vehicle is in operation; and
transmit the subset of the vehicle data to a second device;
wherein the second device is configured to determine that an internet connection to an online network has become available to the second device and to upload the stored vehicle data to the online network accessible by a remote processor based at least in part on the determination that the internet connection has become available.

10. The vehicle data recording device of claim 9, wherein the second device comprises a tablet, phone, or other portable connected device.

11. The vehicle data recording device of claim 9, wherein the first device is further configured to determine the subset of vehicle data to be transmitted to the second device.

12. The vehicle data recording device of claim 9, wherein stored vehicle data comprises time series data.

13. The vehicle data recording device of claim 9, wherein stored vehicle data comprises audio data, video data, or actuator parameters.

14. The vehicle data recording device of claim 9, wherein the vehicle data is transmitted to the second device over a Bluetooth connection, over a local area network, or in absence of an internet or cellular connection.

15. The vehicle data recording device of claim 9, comprising determining whether the internet connection is secured.

16. A computer program product to collect vehicle data, the computer program product being embodied in a non-transitory computer readable medium and comprising computer instructions for:
  receiving vehicle data at a first device on a vehicle during vehicle operation;
  determining a subset of the vehicle data to be stored while the vehicle is in operation; and
  transmitting the subset of the vehicle data to a second device;
  wherein the second device is configured to determine that an internet connection to an online network has become available to the second device and to upload the stored vehicle data to the online network accessible by a remote processor based at least in part on the determination that the internet connection has become available.

17. The computer program product of claim 16, wherein the second device comprises a tablet, phone, or other portable connected device.

18. The computer program product of claim 16, wherein the first device is further configured to determine the subset of vehicle data to be transmitted to the second device.

19. The computer program product of claim 16, wherein stored vehicle data comprises time series data.

20. The computer program product of claim 16, wherein stored vehicle data comprises audio data, video data, or actuator parameters.

21. The method of claim 1, wherein the remote processor is configured to aggregate vehicle data for a plurality of vehicles.

22. The method of claim 1, wherein the first device is configured to collect higher resolution data compared with the second device and the subset of vehicle data transmitted by the second device is lower resolution compared with data collected by the first device.

* * * * *